United States Patent
Gunda et al.

(10) Patent No.: US 9,239,762 B1
(45) Date of Patent: Jan. 19, 2016

(54) METHOD AND APPARATUS FOR VIRTUALIZING FILE SYSTEM PLACEHOLDERS AT A COMPUTER

(75) Inventors: Laxmikant Vithal Gunda, Pune (IN); Pillai Biju Shanmugham, Pune (IN)

(73) Assignee: Symantec Corporation, Mountain View, CA (US)

(*) Notice: Subject to any disclaimer, the term of this patent is extended or adjusted under 35 U.S.C. 154(b) by 254 days.

(21) Appl. No.: 12/539,571

(22) Filed: Aug. 11, 2009

(51) Int. Cl.
*G06F 7/00* (2006.01)
*G06F 17/00* (2006.01)
*G06F 11/14* (2006.01)

(52) U.S. Cl.
CPC .................................. *G06F 11/1448* (2013.01)

(58) Field of Classification Search
None
See application file for complete search history.

(56) References Cited

U.S. PATENT DOCUMENTS

| | | | |
|---|---|---|---|
| 5,001,628 A * | 3/1991 | Johnson et al. | |
| 5,537,585 A * | 7/1996 | Blickenstaff et al. | |
| 5,832,522 A * | 11/1998 | Blickenstaff et al. | |
| 5,873,103 A * | 2/1999 | Trede et al. | |
| 5,978,815 A * | 11/1999 | Cabrera et al. | |
| 5,991,753 A * | 11/1999 | Wilde | |
| 6,191,650 B1 * | 2/2001 | Backram et al. | 330/10 |
| 6,760,758 B1 * | 7/2004 | Lund et al. | 709/217 |
| 6,868,424 B2 * | 3/2005 | Jones et al. | 707/822 |
| 7,383,407 B1 * | 6/2008 | Kiselev | G06F 11/2076 711/162 |
| 7,640,406 B1 * | 12/2009 | Hagerstrom | G06F 17/30153 707/999.01 |
| 7,660,790 B1 * | 2/2010 | Batterywala et al. | 707/999.005 |
| 7,913,053 B1 * | 3/2011 | Newland | 711/172 |
| 7,925,856 B1 * | 4/2011 | Greene | 711/170 |
| 8,046,331 B1 * | 10/2011 | Sanghavi et al. | 707/640 |
| 2001/0014892 A1 * | 8/2001 | Gaither et al. | 707/200 |
| 2002/0056031 A1 * | 5/2002 | Skiba et al. | 711/162 |
| 2003/0051054 A1 * | 3/2003 | Redlich et al. | 709/246 |
| 2003/0120949 A1 * | 6/2003 | Redlich et al. | 713/200 |
| 2004/0049513 A1 * | 3/2004 | Yakir et al. | 707/100 |
| 2004/0088382 A1 * | 5/2004 | Therrien et al. | 709/219 |
| 2004/0167941 A1 * | 8/2004 | Prahlad et al. | 707/204 |
| 2004/0205622 A1 * | 10/2004 | Jones et al. | 715/523 |
| 2005/0004951 A1 * | 1/2005 | Ciaramitaro et al. | 707/104.1 |
| 2005/0021566 A1 * | 1/2005 | Mu | G06F 11/1458 |
| 2005/0033757 A1 * | 2/2005 | Greenblatt et al. | 707/100 |

(Continued)

FOREIGN PATENT DOCUMENTS

| | | | |
|---|---|---|---|
| WO | WO 2004025404 A2 * | 3/2004 | |
| WO | WO 2004025470 A1 * | 3/2004 | |
| WO | WO 2007011576 A2 * | 1/2007 | |

OTHER PUBLICATIONS

Zadok, Erez et. al., "Reducing Storage Management Costs via Informed User-Based Policies," Technical Report FSL-03-01, Proceedings of the 12th NASA Goddard, 21st IEEE Conference on Mass Storage Systems and Technologies (MSST 2004), 2004, pp. 1-15.

(Continued)

*Primary Examiner* — Augustine K Obisesan
(74) *Attorney, Agent, or Firm* — Campbell Stephenson LLP

(57) ABSTRACT

The virtualization of file system placeholders is described. In one embodiment, a method for virtualizing placeholders includes monitoring placeholder creation initiated by at least one archival operation, generating placeholder data in a separate data store from a file system, wherein the placeholder data comprises a plurality of placeholders that correspond with a plurality of archived files, and servicing access requests for at least one archived file of the plurality of archived files using the placeholder data.

20 Claims, 5 Drawing Sheets

(56) References Cited

U.S. PATENT DOCUMENTS

| | | | |
|---|---|---|---|
| 2005/0086231 A1* | 4/2005 | Moore | 707/100 |
| 2005/0257074 A1* | 11/2005 | Alkove et al. | 713/193 |
| 2006/0095470 A1* | 5/2006 | Cochran et al. | 707/104.1 |
| 2006/0129537 A1* | 6/2006 | Torii et al. | 707/3 |
| 2006/0212481 A1* | 9/2006 | Stacey et al. | 707/104.1 |
| 2007/0179990 A1* | 8/2007 | Zimran et al. | 707/201 |
| 2007/0220029 A1* | 9/2007 | Jones et al. | 707/101 |
| 2007/0226809 A1* | 9/2007 | Ellard | 726/30 |
| 2007/0294310 A1* | 12/2007 | Yagawa | 707/200 |
| 2008/0010205 A1* | 1/2008 | Seshasai | 705/51 |
| 2008/0010325 A1* | 1/2008 | Yamakawa | 707/204 |
| 2008/0104612 A1* | 5/2008 | Abernethy, Jr. | H04L 67/28 719/318 |
| 2009/0063393 A1* | 3/2009 | Saake | G06F 17/30073 |
| 2009/0249005 A1* | 10/2009 | Bender et al. | 711/162 |
| 2009/0300079 A1* | 12/2009 | Shitomi | G06F 3/0605 |
| 2009/0319532 A1* | 12/2009 | Akelbein et al. | 707/10 |
| 2009/0319736 A1* | 12/2009 | Otani et al. | 711/162 |
| 2010/0274825 A1* | 10/2010 | Nemoto et al. | 707/812 |

OTHER PUBLICATIONS

Zadok, Erez, et al. Stony Brook University and Columbia University: "Reducing Storage Management Costs Via Informed User-Based Policies," pp. 101-105, 2004.

* cited by examiner

METHOD AND APPARATUS FOR VIRTUALIZING FILE SYSTEM PLACEHOLDERS AT A COMPUTER

BACKGROUND

1. Field of the Invention

Embodiments of the present invention generally relate to file system management and, more particularly, to a method and apparatus for virtualizing file system placeholders at a computer.

2. Description of the Related Art

In typical computing environments, small to large enterprises accumulate a significant amount of mission critical data related to various operations (e.g., business transactions, administration, resource management, manufacturing, services, and/or the like). Based on a file system (e.g., File Allocation Table (FAT), NT File System and/or the like), an operating system stores the mission critical data as files and then organizes these files within one or more volumes. Various data protection software programs may store the mission critical data in various storage devices (e.g., a tape drive, a hard disk drive and/or the like). Furthermore, archival software programs (e.g., Enterprise Vault) may preserve the mission critical data in a repository.

During an archival process, a software program (e.g., an agent associated with the archival software programs) creates a placeholder for an archived file, which replaces the archived file within the file system. The placeholder may be stored within a same folder in which the archived file resided. The placeholder may be dummy file that includes a Uniform Resource Locator (URL) for accessing the archived file in the repository. File system management software (e.g., MICROSOFT Windows Explorer) may display the placeholder as a whole file with each and every attribute but with a changed icon. When a user desires to access the archived file, the software program converts the placeholder into a physical file by downloading file data from the repository.

As the number of files on a computer increases, a number of placeholders also increases as a consequence. For example, the computer may include one million files on a single volume. If each and every file is archived, then a significant number of corresponding placeholders are created. An administrator, unfortunately, must allocate a significant amount of time and resources into managing placeholder creation and controlling access to the placeholders. These activities also consume various computer resources, such as processor cycles, memory capacity, network bandwidth and/or the like, which result in a poor computer system performance and stability. For example, a large number of placeholders slows down a backup process because of time spent analyzing each of the placeholders and determining whether a corresponding archived file is backed up or not. As another example, an anti-virus software program that performs routine security scans to detect and/or remove potential malware must scan each and every one of the placeholders.

Occasionally, a user may displace a placeholder within a file system. As a result, it is difficult to determine an original location (e.g., a directory, a folder and/or the like) associated with the displaced placeholder. In addition, when the archived file is restored, file data is stored at location associated with the archived file and not at a current location associated with the displaced placeholder. For example, the user may move a placeholder 'P' from a directory 'X' to a directory 'Y'. Hence, when the placeholder 'P' is accessed, the corresponding archived file is restored to the directory 'X' and not the directory 'Y'.

Furthermore, the user may migrate a home directory and/or one or more shared folders from one location (e.g., a server, a storage subsystem and/or the like) to another location (e.g., a server, a storage subsystem and/or the like). The placeholders, however, are not adjusted accordingly. Furthermore, access rights and permissions for the archived files must be maintained, which results in an additional burden on a file server to periodically scan for changes to the access rights.

Therefore, there is a need in the art for a method and apparatus for virtualizing file system placeholders.

SUMMARY OF THE INVENTION

Embodiments of the present disclosure include a method and apparatus for virtualizing file system placeholders. In one embodiment, the method for virtualizing placeholders in memory using one or more processors includes monitoring placeholder creation initiated by at least one archival operation, generating placeholder data in a separate data store from a file system, wherein the placeholder data comprises a plurality of placeholders that correspond with a plurality of archived files and servicing access requests for at least one archived file of the plurality of archived files using the placeholder data.

In some embodiments, the access requests from at least one registered application to the separate data store are redirected. In some embodiments, file data for the at least one archived file are recalled from a repository. In some embodiments, the plurality of placeholders are inaccessible by a plurality of software applications. In some embodiments, the plurality of archived files are transformed into the plurality of placeholders. In some embodiments, the plurality of placeholders are configured to be unviewable to an operating system. In some embodiments, the at least one archived file is downloaded to a volume that is organized in accordance with the file system. In some embodiments, at least one registered software application is permitted access to the separate data store to examine the placeholder data.

In another embodiment, an apparatus for virtualizing placeholders in memory using one or more processors includes means for examining placeholder creation initiated by at least one archival operation, means for creating placeholder data that is stored in a separate data store from a file system, wherein the placeholder data comprises a plurality of placeholders that correspond with a plurality of archived files, wherein the plurality of placeholders are inaccessible by at least one software application and means for accessing the separate data store to process access requests for at least one archived file of the plurality of archived files.

In some embodiments, the apparatus may further include means for registering at least one software application with access rights to the placeholder data. In some embodiments, the apparatus may further include means for servicing the access requests from at least one registered application using the separate data store. In some embodiments, the apparatus may further include means for recalling file data for the at least one archived file from a repository. In some embodiments, the apparatus may further include means for transforming a plurality of archived files into the plurality of placeholders.

In some embodiments, the apparatus may further include means for communicating the at least one archived file to a volume that is organized in accordance with the file system. In some embodiments, the apparatus may further include means for permitting the at least one registered software application access to the separate data store to examine the placeholder data. In some embodiments, the apparatus may further include means for configuring the plurality of placeholders to be unviewable to an operating system.

In a yet another embodiment, a computer-readable-storage medium is provided. The computer-readable-storage medium comprising one or more processor-executable instructions that, when executed by at least one processor, causes the at least one processor to monitor placeholder creation initiated by at least one archival operation, generate placeholder data in a separate data store from a file system, wherein the placeholder data comprises a plurality of placeholders that correspond with a plurality of archived files and service access requests for at least one archived file of the plurality of archived files using the placeholder data. In some embodiments, the one or more processor-executable instructions may redirect the access requests from at least one registered application to the separate data store. In some embodiments, the one or more processor-executable instructions may recall file data for the at least one archived file from a repository. In some embodiments, the one or more processor-executable instructions may transform the plurality of archived files into the plurality of placeholders.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
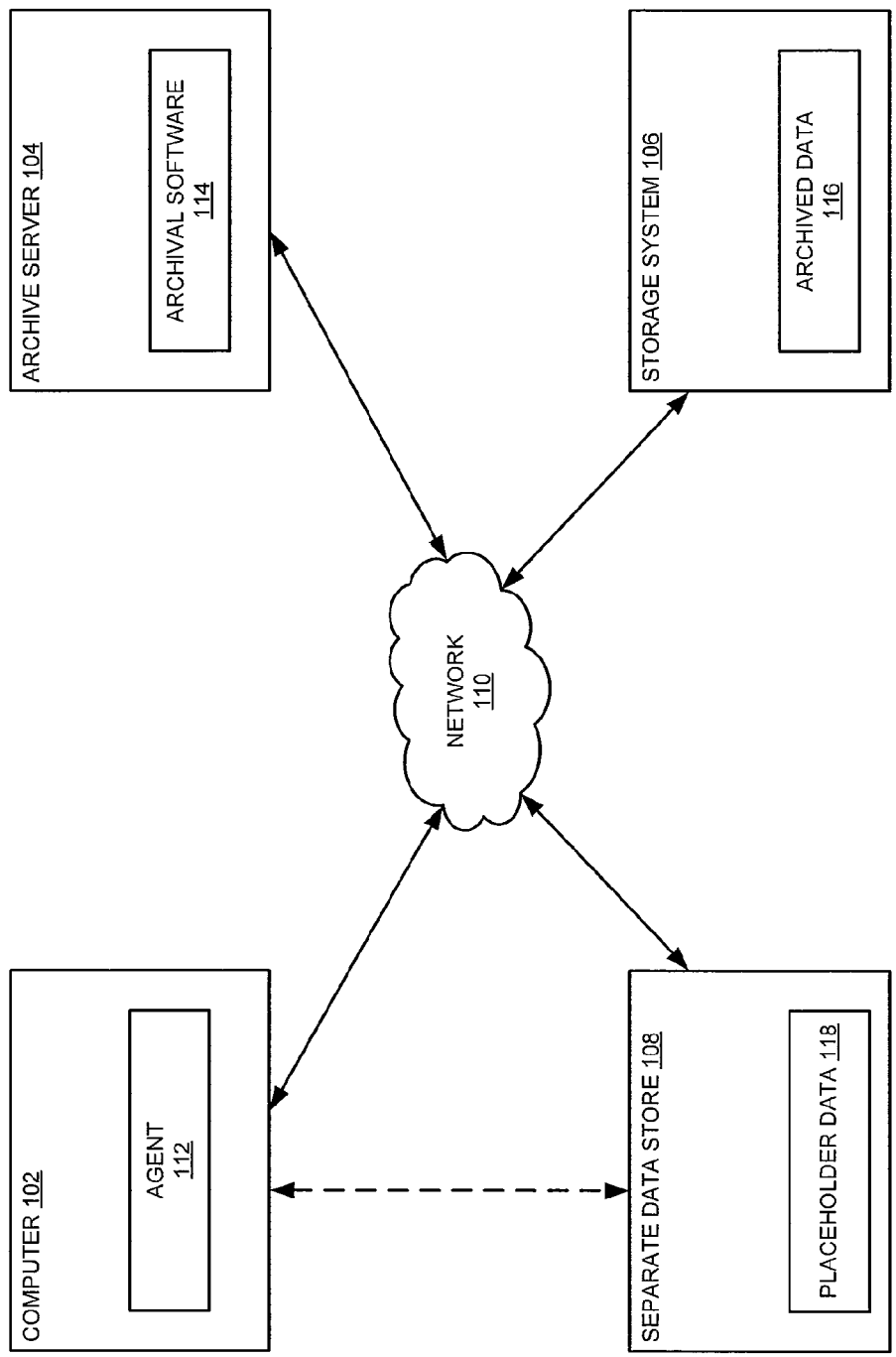
FIG. 1 is a block diagram of a system for virtualizing file system placeholders, according to one or more embodiments.

As explained in detail further below, various embodiments of the present disclosure enable file system storage space reduction by virtualizing placeholders for a plurality of archived files. In some embodiments, after archival software (e.g., archival software 114 of FIG. 1) cooperates with an agent (e.g., the agent 112 of FIG. 1) in order to perform various archival operations. A placeholder (e.g., placeholder data 118 of FIG. 1) may be generated for each and every file of the plurality of archived files. The placeholder may be a file system shortcut to actual file data as explained in further detail below. The agent stores each and every placeholder in a separate data store from a file system. The plurality of archived files and corresponding placeholders are not stored or organized as objects in the file system. The corresponding placeholders, hence, are rendered unviewable under the file system and inaccessible by the operating system and/or various software applications.

During a security scan, for example, an anti-virus software application cannot scan the plurality of archived files and the corresponding placeholders as a result. On the other hand, a monitor module (e.g., the monitor module 414 of FIG. 4) may register the anti-virus software application with access rights to the placeholders according to embodiments. On behalf of the anti-virus software application, the agent may instruct a service module (e.g., service module 418 of FIG. 1) to access the requested placeholders in the separate data store and recall file data for corresponding archived files. The tasks initiated by the agent serves to reduce storage space utilize by various file systems, simplify placeholder management and administration as well as to support global namespace based file systems and replication. Within the archive, the agent also updates metadata associated with the corresponding placeholders after a particular placeholder is moved (e.g., to another directory) and/or one or more permissions are changed according to some embodiments.

FIG. 1 is a block diagram of a system 100 for virtualizing file system placeholders according to one embodiment. The system 100 may form a computing environment that comprises a computer 102, an archive server 104, storage 106 and a separate data store 108 where each is coupled to each other through a network 110.

The computer 102 may be a type of computing device (e.g., a laptop, a desktop, a terminal and/or the like) known to one of ordinary skill in the art having the benefit of this disclosure. In some embodiments, the computer 102 may be a client computer or a file server through which a user may operate various software applications (e.g., MS WORD, MS EXCEL, POWERPOINT and/or the like) to access, modify, delete and/or create data within the one or more files. For example, the computer 102 may remotely access the one or more files by mapping a volume drive letter to a primary data store that includes the one or more files. The data store may be coupled to the file server locally and/or through a Storage Area Network (SAN).

Certain software applications, such as a backup software programs, anti-virus software programs and/or the like, may execute various processes on the primary data store at scheduled times. Therefore, on each run, the backup software program and/or the anti-virus software program scans each and every file and/or placeholder to perform operations (e.g., perform backup, check for virus, malware and/or the like). The computer 102 includes an agent 112 as explained further below.

Generally, the archive server 104 may be a type of computing device (e.g., a laptop, a desktop and/or the like) known to one of ordinary skill in the art having the benefit of this disclosure. The archive server 104 may provide various services (e.g., application services, storage services and/or the like) to one or more computers, such as the computer 102. The archive server 104, as an example, includes various software packages, such as archival software 114. In some embodiments, the archival software 114 includes software code that is configured to perform various archival operations on one or more files as explained further below. According to various embodiments, the archival software 114 may cooperate with the agent 112 to store one or more files from the computer 102 in the storage system 106. In addition, these archival operated may be defined by administrator and user defined policies.

The storage system 106 generally includes various components (i.e., hardware and/or software) that are configured to manage storage resources within the computing environment. The storage 106 may include one or more data storage devices (e.g., hard disk drives, optical drives, magnetic tape drives and/or the like) and storage management software that provides an interface (e.g., Integrated Drive Electronics/AT Attachment (IDE/ATA), Small Computer Systems Interface (SCSI) and/or the like) to the one or more data storage devices for one or more computing devices, such as the computer 102 and/or the archive server 104. In one embodiment, one or more file servers (i.e., the agent 112 running on the computer 102) may utilize one or more LUNs within the storage system 106 as a primary data store for a plurality of files. In some embodiments, the archival software 114 stores the plurality of files from one or more user computers as the archived data 116 and replaces each file with a placeholder as explained in the present disclosure.

The network 110 comprises a communication system that connects computers by wire, cable, fiber optic and/or wireless link facilitated by various types of well-known network elements, such as hubs, switches, routers, and the like. The network 110 may employ various well-known protocols to communicate information amongst the network resources. For example, the network 110 may be a part of the Internet or Intranet using various communications infrastructure such as Ethernet, WiFi, WiMax, General Packet Radio Service (GPRS), and the like.

In some embodiments, the agent 112 includes software code (e.g., processor executable instructions) for transforming the one or more files into corresponding placeholders. Once the placeholders are created, the agent 112 generates corresponding placeholder data 118 associated with each of the placeholder. In one or more embodiments, the placeholder data 118 is communicated to a data store that is kept hidden from a file system. As such, the one or more placeholders are unviewable to the one or more applications (e.g., the backup software program, the anti-virus software program and/or the like) running on the computer 102.

The separate data store 108 may include various components (i.e., hardware and/or software) that are configured to manage storage space according to one or more embodiments. The separate data storage 108 may include one or more data storage devices (e.g., hard disk drives, optical drives, magnetic tape drives and/or the like) as well as storage management software that provides an interface (e.g., Integrated Drive Electronics/AT Attachment (IDE/ATA), Small Computer Systems Interface (SCSI) and/or the like) to the one or more data storage devices. In some embodiments, the separate data store 108 may include a database for storing the placeholder data 118. Alternatively, the separate data store 108 may include storage space within a volume. For example, the placeholder data 118 may be stored in a special file within each folder. As explained further below, the special file may indicate one or more placeholders for archived filed within the folder. An operating system cannot recognize the placeholder data 118 because the volume does not include metadata for any of the placeholders. Furthermore, the separate data store 108 may be coupled with a computer for facilitating access to the placeholder data 118. As such, the separate data store 108 may include one or more locally or remotely connected LUNs that are coupled with the archive server 104, the computer 102, a storage server associated with the storage system 106 and/or another computer.

In some embodiments, the placeholder data 118 includes a plurality of placeholders that correspond with various files at the computer 102. Each of the placeholders may include a Uniform Resource Locator (URL) that corresponds with an archived file in the storage system 106. The placeholder data 118 is not included within a volume that is utilized by the computer 102 for storing the various files. The file system, hence, does not recognize any of the corresponding placeholders for the various files. These placeholders may also be configured to be inaccessible by the one or more applications (e.g., backup/restore software programs, anti-virus software programs and the like). In some embodiments, these applications may not be permitted to access the one or more placeholders or perform any operations on the corresponding archived files.

Figure 2:
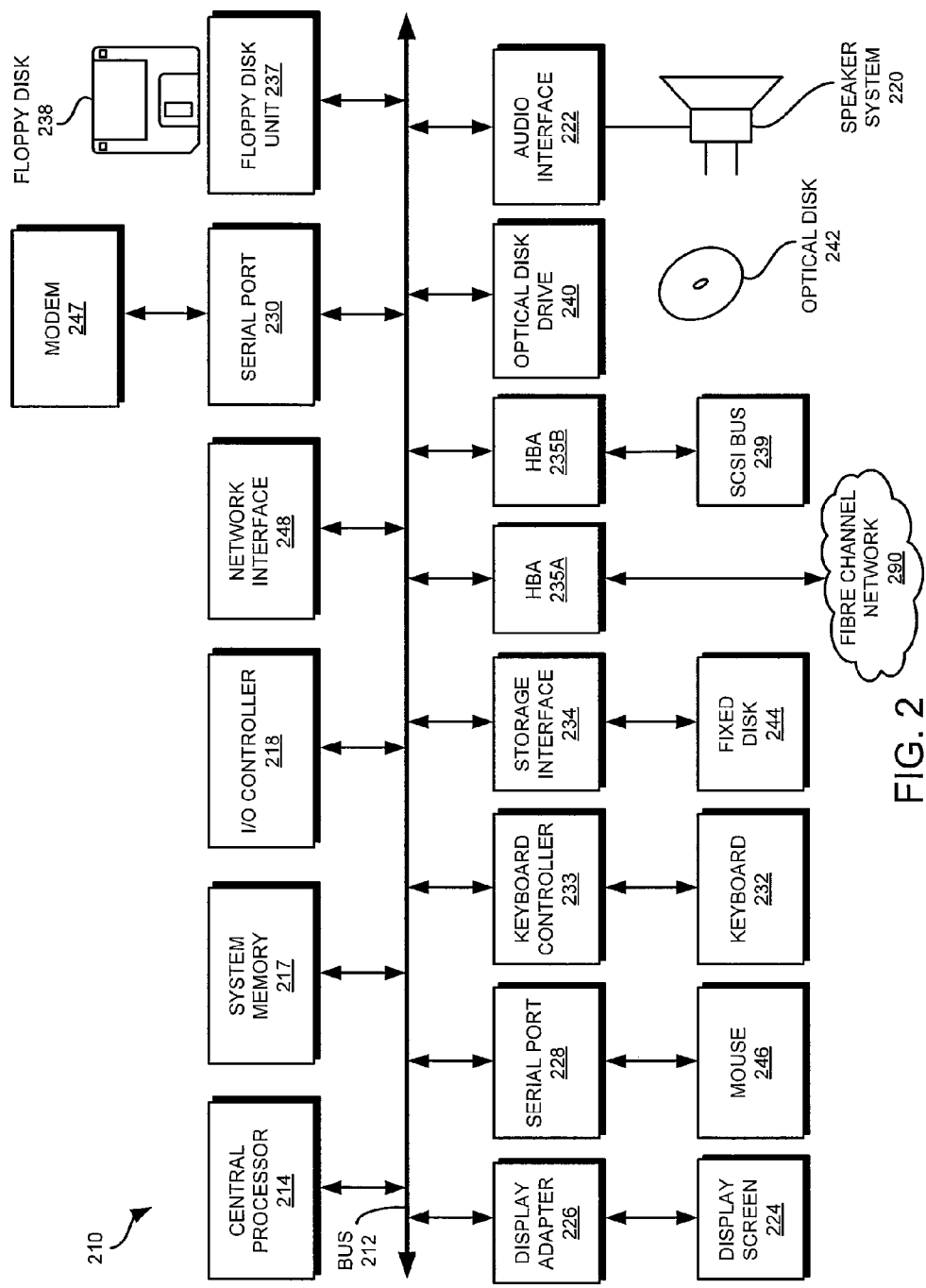
FIG. 2 is a block diagram of a suitable computer for implementing the present disclosure, according to one or more embodiments.

FIG. 2 is a block diagram of a computer system 210 suitable for implementing the present disclosure. This system 210 is representative of a computer system that can be used to implement the computer 102 and/or the archive server 104 of FIG. 1. Computer system 210 includes a bus 212 which interconnects major subsystems of computer system 210, such as a central processor 214, a system memory 217 (typically RAM, but which may also include ROM, flash RAM, or the like), an input/output controller 218, an external audio device, such as a speaker system 220 via an audio output interface 222, an external device, such as a display screen 224 via display adapter 226, serial ports 228 and 230, a keyboard 232 (interfaced with a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included are a mouse 246 (or other point-and-click device, coupled to bus 212 via serial port 228), a modem 247 (coupled to bus 212 via serial port 230), and a network interface 248 (coupled directly to bus 212).

Bus 212 allows data communication between central processor 214 and system memory 217, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral devices. Applications resident with computer system 210 are generally stored on and accessed via a computer readable medium, such as a hard disk drive (e.g., fixed disk 244), an optical drive (e.g., optical drive 240), a floppy disk unit 237, or other storage medium. Additionally, applications can be in the form of electronic signals modulated in accordance with the application and data communication technology when accessed via network modem 247 or interface 248.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. The operation of a computer system such as that shown in FIG. 2 is readily known in the art and is not discussed in detail in this application. Code to implement the present disclosure can be stored in computer-readable storage media such as one or more of system memory 217, fixed disk 244, optical disk 242, or floppy disk 238. The operating system provided on computer system 210 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 3:
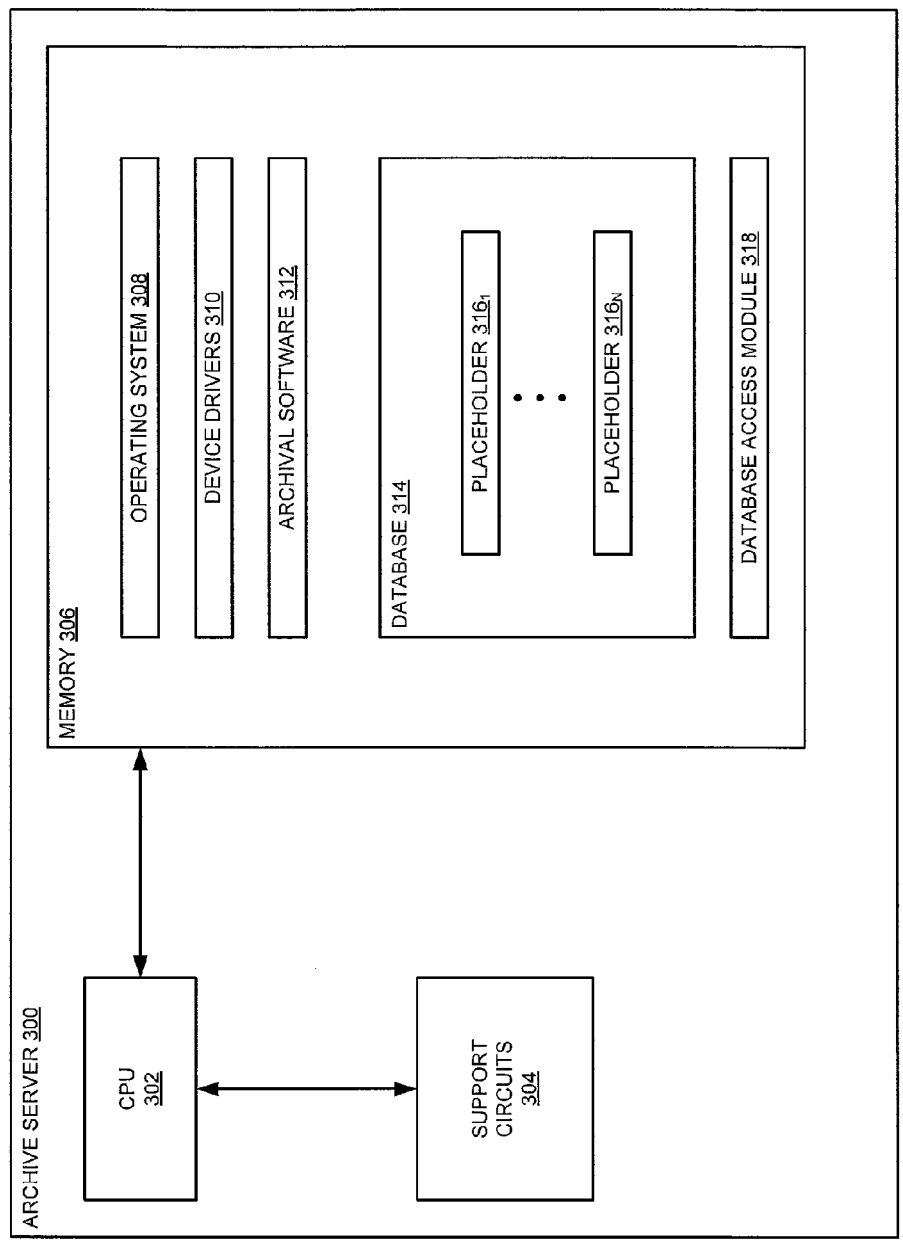
FIG. 3 is a block diagram of a server for virtualizing file system placeholders, according to one or more embodiments.

FIG. 3 is a block diagram of a server 300 for virtualizing file system placeholders according to one or more embodiments. The server 300 is a type of computing device (e.g., a laptop, a desktop and/or the like) that comprises a Central Processing Unit (CPU) 302, various support circuits 304 and a memory 306. The CPU 302 may comprise one or more commercially available microprocessors or microcontrollers that facilitate data processing and storage. Various support circuits 304 facilitate operation of the CPU 302 and may include clock circuits, buses, power supplies, input/output circuits and/or the like. The memory 306 includes a read only memory, random access memory, disk drive storage, optical storage, removable storage, and the like. The memory 306 includes an operating system 308, device drivers 310 as well as various data and software packages, such as archival software 312, a database 314, a plurality of placeholders 316 and a database access module 318. In one or more embodiments, the server 300 may include a Common Internet File System (CIFS) server application or a Network File System (NFS) server application that provides file system services to various CIFS clients (e.g., the computer 102 of FIG. 1) and NFS clients, respectively.

The operating system 308 generally manages various computer resources (e.g., network resources, data storage resources, file system resources and/or the like). The operating system 308 is configured to execute operations on one or more hardware and/or software devices, such as Network Interface Cards (NICs), hard disks, virtualization layers, firewalls and/or the like. For example, the various software packages call commands associated with the operating system 308 (i.e., native operating system commands) to perform various file system and/or storage operations, such as creating files or metadata, writing data to the files, reading data from the files, modifying metadata associated with the files and/or the like. The operating system 308 may call one or more functions associated with the device drivers 310 to execute various file system and/or storage operations. As an example, the operating system 308 may utilize a device driver associated with a Network Interface Card (NIC) card to communicate data to another computer as explained further below.

The archival software 312 includes software code (e.g., processor executable instructions) that may be executed by the CPU 302 to perform archival operations on one or more files from a user computer (e.g., the computer 102 of FIG. 1). The archival software 312 may perform these archival operations in accordance on administrator pre-defined policies. During an archival process, the archival software 312 archives one or more files and creates corresponding placeholders 316 within the database 314.

According to some embodiments, the database 314 includes information associated with the plurality of placeholders 316. Because the database 314 does not form a portion of any volume utilized by one or more user computers (e.g., the computer 102 of FIG. 1), the plurality of placeholders 316 are not viewable within a file system. Each placeholder 316 may define a Uniform Resource Locator (URL) associated with a corresponding archived file. A registered software application, however, at the user computer (e.g., the computer 102 of FIG. 1) may initiate various commands (e.g., readdir, getattr, read, write, set-attr, and/or the like) for requesting access to the one or more placeholders 316.

In one embodiment, the database access module 318 includes software code (e.g., processor executable instructions) that, when executed by the CPU 302, facilitates access to the placeholders 316. For example, the agent may communicate a write request for a certain placeholder. The database access module 318 processes the write request and stores the certain placeholder within the database 314. In another embodiment, the archival software 312 provides the one or more files from archived data (e.g., the archived data 116 of FIG. 1).

Figure 4:
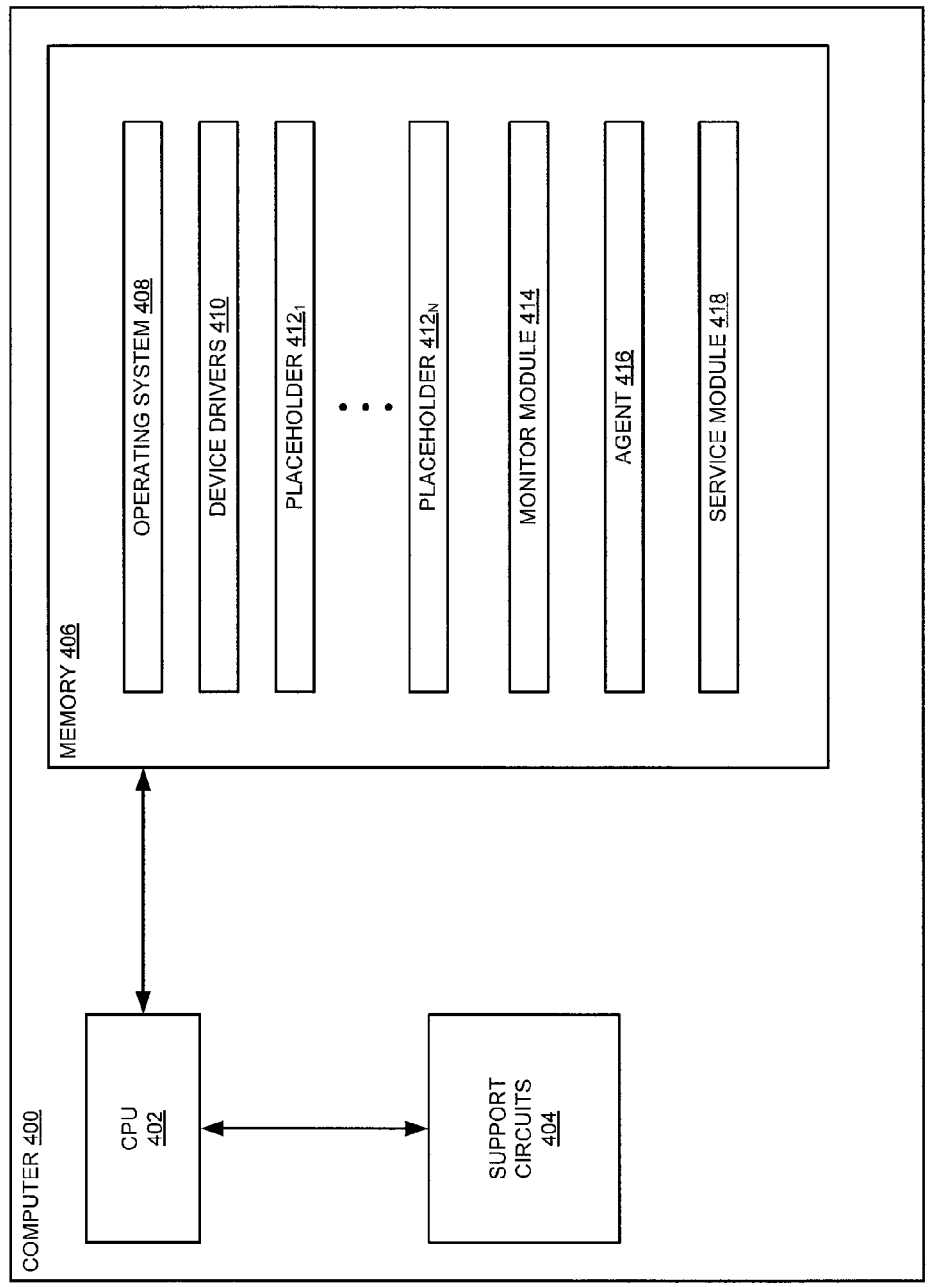
FIG. 4 is a block diagram of a computer for virtualizing file system placeholders, according to one or more embodiments.

FIG. 4 is a block diagram of a computer 400 for virtualizing file system placeholders according to one or more embodiments. For example, the computer 400 may be a file server that provides application and data services to one or more networked user computers. Alternatively, the computer 400 may be client computer that cooperates with the file server to access and/or modify a plurality of files.

The computer 400 is a type of computing device (e.g., a laptop, a desktop and/or the like) that comprises a Central Processing Unit (CPU) 402, various support circuits 404 and a memory 406. The CPU 402 may comprise one or more commercially available microprocessors or microcontrollers that facilitate data processing and storage. Various support circuits 404 facilitate operation of the CPU 402 and may include clock circuits, buses, power supplies, input/output circuits and/or the like. The memory 406 includes a Read Only Memory, Random Access Memory, disk drive storage, optical storage, removable storage, and the like. The memory 406 includes an operating system 408 and device drivers 410 as well as various data and software packages, such as a plurality of placeholders 412, a monitor module 414, an agent 416 and a service module 418.

The operating system 408 generally manages various computer resources (e.g., network resources, data storage resources, file system resources and/or the like). The operating system 408 is configured to execute operations on one or more hardware and/or software devices, such as Network Interface Cards (NICs), hard disks, virtualization layers, firewalls and/or the like. The operating system 408 may also include Common Internet File System (CIFS) client software modules or Network File System (NFS) client software modules. For example, the various software packages call commands associated with the operating system 408 (i.e., native operating system commands) to perform various file system and/or storage operations, such as creating files or metadata, writing data to the files, reading data from the files, modifying metadata associated with the files and/or the like. The operating system 408 may call one or more functions associated with the device drivers 410 to execute various file system and/or storage operations. As an example, the operating system 408 may utilize a device driver associated with a NIC card to communicate data to another computer as explained further below.

In some embodiments, the monitor module 414 includes software code (e.g., processor executable instructions) that may be executed by the CPU 402 to examine placeholder creation that may be initiated by archival operations. In some embodiments, when the CPU 402 recalls the instructions of the monitor module 414 from the memory 406 and executes the monitor module 414, the CPU 402 performing the tasks associated with the monitor module 414, as recited above, form a means for examining placeholder creation initiated by the archival operations.

As archival software (e.g., the archival software 114 of FIG. 1 and the archival software 312 of FIG. 3) archives one or more files of a computer (e.g., the computer 102 of FIG. 1), the agent 416 creates one or more corresponding placeholders 412 in a separate data store (e.g., the separate data store 108 of FIG. 1). In some embodiments, the monitor module 414 maintains information associated with various software applications. Such information, for example, may indicate one or more software applications that are permitted access to the placeholders 412 as well as any corresponding archived files. In other words, the one or more software applications are allowed request to view the placeholders 412 and/or access any corresponding archived file.

A user may update this information to register one or more files and/or folders with a particular software application. In some embodiments, the monitor module 414 registers the particular software application with appropriate access rights. For example, a backup software program may need to access metadata associated with an archived file. Accordingly, the backup software program may be registered with access rights to a particular placeholder that corresponds with the archived file of the placeholders 412.

In some embodiments, the agent 416 includes software code (e.g., processor executable instructions) that is executed by the CPU 402 to transform the one or more files into the placeholders 412. In some embodiments, when the CPU 402 recalls the instructions of the agent 416 from the memory 406 and executes the agent 416, the CPU 402 performing the tasks associated with the agent 416, as recited above, form a means for creating placeholder data that is stored in the separate data store from the file system and inaccessible by one or more software applications.

The agent 416 may include a plug-in for various file management software modules (e.g., MICROSOFT Windows Explorer) that provide a graphical view of an entire file system or modules that provide a command line shell (e.g. Windows Command Prompt, UNIX Bash shell). In another embodiment, the agent 416 may include a file system filter driver that supports a CIFS or NFS protocol and controls access to the placeholders 412 as well as the corresponding archived files. For example, the agent 416 may generate a CIFS or NFS interface for accessing a volume that is organized in accordance with a file system. In one embodiment, the user may utilize various commands (e.g., readdir, read, write, set-att, getattr and/or the like) to access one or more placeholders 412.

The agent 416 cooperates with archival software (e.g., the archival software 312 of FIG. 3) to generate the placeholders 316 for a plurality of archived files. Then, the agent 416 stores the placeholders in a hidden or separate data store (e.g., the separate data store 108 of FIG. 1) from the file system (i.e., a local file system). Accordingly, the placeholders 412 are not accessible by the plurality of applications (e.g., a backup software program, an anti-virus software program) on the computer 400. In addition, the agent 416 may internally cache, in the memory 406, attribute data associated with the plurality of archived files.

According to one or more embodiments, the service module 418 includes software code (e.g., processor executable instructions) that is executed by the CPU 402 to service access requests for archived files using the placeholders 412. In some embodiments, when the CPU 402 recalls the instructions of the service module 418 from the memory 406 and executes the service module 418, the CPU 402 performing the tasks associated with the comparison module 418, as recited above, form a means for accessing the separate data store to process access requests for one or more archived file of the plurality of archived files.

In some embodiments, only registered applications may initiate the access requests for archived data. The service module 418 subsequently recalls the one or more files from the archived data that corresponds to the accessed placeholder 412. For example, an anti-virus software program may desire to scan a particular archived file and the service module 418, in response, downloads the particular file into the memory 406. In some embodiments, the agent 416 cooperates with a server (e.g., the archive server 104 of FIG. 1) to access a repository (e.g., the storage system 106) and recall file data associated with the particular archived file. The archival server communicates the particular archived file to the service module 418. In some embodiments, the service module 418 stores the particular archived file at an original location within the volume.

Figure 5:
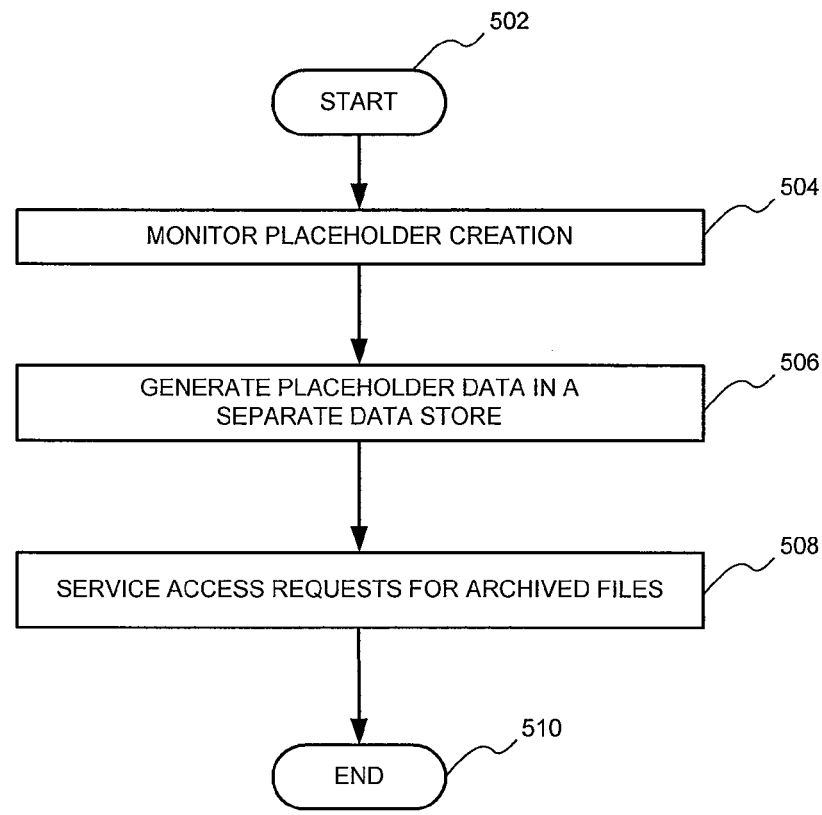
FIG. 5 is a flow diagram of a method for virtualizing file system placeholders, according to one or more embodiments.

FIG. 5 is a flow diagram of a method 500 for virtualizing file system placeholders according to one or more embodiments.

In some embodiments, various software modules (e.g., the archival software 312 of FIG. 3, the monitor module 414 of FIG. 4, the agent 416 of FIG. 4 and/or the service module 418 of FIG. 4) in memory may cooperate to transform one or more files into virtual placeholders and store these placeholders in a separate data store from a file system. In some embodiments, these software modules may be executed by one or more processors to control access to the placeholder data (e.g., the placeholder data 118) as explained in the present disclosure.

The method 500 starts at step 502 and proceeds to step 504. At step 504, placeholder (e.g., the placeholders 316 of FIG. 3 and the placeholders 412 of FIG. 4) creation is monitored. Archival software (e.g., the archival software 114 of FIG. 1 and the archival software 312 of FIG. 3) cooperates with an agent (e.g., the agent 416 of FIG. 4) to perform various archival operations on one or more files at a computer (e.g., the computer 102 of FIG. 1 and the computer 400 of FIG. 4). In some embodiments, a monitor module may be executed by the one or more processors to examine each and every archival operation. In some embodiments, the monitor module may process the placeholder data and produce a graphical user interface for accessing the corresponding files. In some embodiments, a particular file to be archived may need to be viewable by one or more registered applications. For example, an anti-virus software program must be able to scan a corresponding placeholder as well as data within the particular file. The monitor module maps the particular file to the one or more registered applications.

At step 506, a placeholder data (e.g., the placeholder data 118 of FIG. 1) is generated in a separate data store. For each archived file, the agent creates a placeholder in the separate data store according to some embodiments. In some embodiments, the agent may store each and every placeholder in a database that is hidden from a local file system and inaccessible by one or more software applications. Such a database may reside on a file server (e.g., the server 300 of FIG. 3). In another embodiment, the database may be stored in a storage device that forms a portion of a network file system to which the file server controls access. Alternatively, the placeholders may be stored locally at the user computer while remaining concealed from the local file system. For example, the agent may store the placeholders in a special file in a volume. Because the volume may include no metadata, the operating system cannot access these placeholders.

At step 508, an access request for an archived file is serviced using the separate data store. A particular software application may request access to the one or more placeholders and/or one or more corresponding archived files. If the particular software application registered, then the access request may be redirected to the separate data store, which responds with the one or more corresponding archived files. In some embodiments, a service module (e.g., the service module 418 of FIG. 4) is executed by the one or more processors to service the access request using the separate data store and/or an archive repository (e.g., the archived data 116 of FIG. 1).

In some embodiments, the service module communicates the access request to a database access module running within the file server (e.g., the server 300). The database access module, in turn, responds with the one or more placeholders, which include URLs for the one or more corresponding archived files. Then, the service module utilizes these URLs to recall file data associated with the one or more corresponding archived files according to one or more embodiments. At step 510, where the method 500 ends.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

While the foregoing is directed to embodiments of the present invention, other and further embodiments of the invention may be devised without departing from the basic scope thereof, and the scope thereof is determined by the claims that follow.

The invention claimed is:

1. A method comprising:
performing an archive operation, wherein
the archive operation archives a file stored in a first computer system,
the archive operation comprises copying the file from the first computer system to a second computer system, and
the first computer system comprises a file system;
creating a placeholder in a separate data store, in response to the performing the archive operation, wherein
the placeholder corresponds to the file,
the creation of the placeholder in the separate data store is initiated by the performing of the archive operation,
the placeholder is not stored in the first computer system or the second computer system,
the separate data store is other than the first computer system and the second computer system,
the placeholder is unviewable by the file system, and
the placeholder is unviewable and inaccessible by a plurality of unregistered applications;
selectively registering an application of the plurality of applications, wherein
the file is mapped to the application, and
the selectively registering the application grants the application access rights to the placeholder in the separate data store;
maintaining information associated with the application, wherein
the information indicates that the application has permission to access the placeholder in the separate data store; and
servicing an access request, in response to determining that
the access request was received from the application and that the application is registered to access the placeholder, wherein
the access request is redirected to the separate data store,
the access request is a request to access at least one archived file of a plurality of archived files or the placeholder,
the servicing comprises granting access to the at least one archived file, and
accessing the at least one archived file utilizes the placeholder in the separate data store.

2. The method of claim 1, further comprising: redirecting the access request from the application to the separate data store.

3. The method of claim 1, further comprising: recalling file data for the at least one archived file from a repository.

4. The method of claim 1, further comprising:
transforming the plurality of archived files into a plurality of placeholders.

5. The method of claim 1, wherein the generating the placeholder further comprises:
configuring the placeholder to be unviewable to an operating system.

6. The method of claim 1, further comprising:
downloading the at least one archived file to a volume that is organized in accordance with the file system.

7. The method of claim 1, wherein accessing the separate data store further comprises:
permitting the application to access the separate data store to examine the placeholder.

8. The method of claim 1, wherein
the separate data store is located on a third computer system, and
the storing the place holder in the separate data store comprises accessing a placeholder database on the third computer system.

9. The method of claim 1, wherein
the archive operation is performed by archive software,
an agent creates the placeholder concurrently with the performing the archive operation, and
the selectively registering the application is performed by a monitor module.

10. A system comprising:
one or more processors;
memory coupled to the one or more processors, wherein
the memory stores program instructions executable by the one or more processors to:
perform an archive operation, wherein
the archive operation archives a file stored in a first computer system, the archive operation comprises copying the file from the first computer system to a second computer system, and the first computer system comprises a file system;

create a placeholder in a separate data store, in response to the detecting the archive operation, wherein the placeholder corresponds to the file, the creation of the placeholder in the separate data store is initiated by the performing of the archive operation, the placeholder is not stored in the first computer system or the second computer system, the separate data store is other than the first computer system and the second computer system, the placeholder is unviewable by the file system, and the placeholder is unviewable and inaccessible by a plurality of unregistered applications;

selectively register an application of the plurality of applications, wherein the file is mapped to the application, and selectively registering the application grants the application access rights to the placeholder in the separate data store;

maintain information associated with the application, wherein the information indicates that the application has permission to access the placeholder in the separate data store; and access the data store to process an access request, in response to determining that the access request was received from the application and that the application is registered to access the placeholder, wherein the access request is redirected to the separate data store, the access request is a request to access at least one archived file of a plurality of archived files or the placeholder, and accessing the separate data store comprises granting access to the at least one archived file using the placeholder in the separate data store.

11. The system of claim 10, wherein the program instructions are further executable to:

redirect the access request from the application to the separate data store.

12. The system of claim 10, wherein the program instructions are further executable to:

recall file data for the at least one archived file from a repository.

13. The system of claim 10, wherein the program instructions are further executable to:

transform the plurality of archived files into a plurality of placeholders.

14. The system of claim 10, wherein the program instructions are further executable to:

communicate the at least one archived file to a volume that is organized in accordance with the file system.

15. The system of claim 10, wherein the program instructions are further executable to:

permit the application to access the separate data store to examine the placeholder.

16. The system of claim 10, wherein the program instructions are further executable to:

configure the plurality of placeholders to be unviewable to an operating system.

17. A non-transitory computer-readable-storage medium comprising one or more processor-executable instructions that, when executed by at least one processor, causes the at least one processor to:

perform an archive operation, wherein the archive operation archives a file stored in a first computer system, the archive operation comprises copying the file from the first computer system to a second computer system, and the first computer system comprises a file system;

create a placeholder in a separate data store in response to the detecting the archive operation, wherein the placeholder corresponds to the file, the creation of the placeholder in the separate data store is initiated by the performing of the archive operation, the placeholder is not stored in the first computer system or the second computer system, the separate data store is other than the first computer system and the second computer system, the placeholder is unviewable by the file system, and the placeholder is unviewable and inaccessible by a plurality of unregistered applications;

selectively register an application of the plurality of applications, wherein the file is mapped to the application, and the selectively registering the application grants the application access rights to the placeholder in the separate data store;

maintain information associated with the application, wherein the information indicates that the application has permission to access the placeholder in the separate data store; and service an access request, in response to determining that the access request was received from the application and that the application is registered to access the placeholder, wherein the access request is redirected to the separate data store, the access request is a request to access at least one archived file of a plurality of archived files or the placeholder, and accessing the separate data store comprises granting access to the at least one archived file using the placeholder in the separate data store.

18. The non-transitory computer-readable-storage medium of claim 17, wherein the one or more processor-executable instructions, when executed by the at least one processor, further cause the at least one processor to:

redirect the access request from the application to the separate data store.

19. The non-transitory computer-readable-storage medium of claim 17, wherein the one or more processor-executable instructions, when executed by the at least one processor, further cause the at least one processor to:

recall file data for the at least one archived file from a repository.

20. The non-transitory computer-readable-storage medium of claim 17, wherein the one or more processor-executable instructions, when executed by the at least one processor, further cause the at least one processor to:

transform the plurality of archived files into a plurality of placeholders.

\* \* \* \* \*